United States Patent
Hagiwara et al.

(10) Patent No.: US 9,447,944 B2
(45) Date of Patent: Sep. 20, 2016

(54) UNSATURATED POLYESTER RESIN COMPOSITION, MOLDED ARTICLE THEREOF, AND LAMP REFLECTOR

(71) Applicants: SHOWA DENKO K.K., Tokyo (JP); STANLEY ELECTRIC CO., LTD., Tokyo (JP)

(72) Inventors: Nobuhito Hagiwara, Tokyo (JP); Kentaro Aoyama, Tokyo (JP); Toshitada Miki, Tokyo (JP); Eiji Mano, Tokyo (JP)

(73) Assignees: SHOWA DENKO K.K., Tokyo (JP); STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/403,346

(22) PCT Filed: May 15, 2013

(86) PCT No.: PCT/JP2013/063568
§ 371 (c)(1),
(2) Date: Nov. 24, 2014

(87) PCT Pub. No.: WO2013/179895
PCT Pub. Date: Dec. 5, 2013

(65) Prior Publication Data
US 2015/0099827 A1    Apr. 9, 2015

(30) Foreign Application Priority Data

May 28, 2012 (JP) .................... 2012-120984

(51) Int. Cl.
| | |
|---|---|
| C08K 7/22 | (2006.01) |
| F21V 7/22 | (2006.01) |
| C08F 283/01 | (2006.01) |
| C08K 7/28 | (2006.01) |
| C08K 7/14 | (2006.01) |
| C08J 5/04 | (2006.01) |
| C08J 5/10 | (2006.01) |
| C08K 3/26 | (2006.01) |
| C08K 5/098 | (2006.01) |
| F21W 101/10 | (2006.01) |

(52) U.S. Cl.
CPC ............... *F21V 7/22* (2013.01); *C08F 283/01* (2013.01); *C08J 5/043* (2013.01); *C08J 5/10* (2013.01); *C08K 3/26* (2013.01); *C08K 5/098* (2013.01); *C08K 7/14* (2013.01); *C08K 7/28* (2013.01); *C08J 2367/06* (2013.01); *C08K 2003/265* (2013.01); *C08K 2201/003* (2013.01); *F21W 2101/10* (2013.01)

(58) Field of Classification Search
CPC ............ C08K 7/22; C08K 7/24; C08K 7/26; C08K 7/28
USPC .................................. 523/218, 219
See application file for complete search history.

(56) References Cited

U.S. PATENT DOCUMENTS

| | | |
|---|---|---|
| 5,246,983 A | 9/1993 | Shibata et al. |
| 2007/0197687 A1 | 8/2007 | Yamane et al. |

FOREIGN PATENT DOCUMENTS

| | | |
|---|---|---|
| JP | 62-84151 | 4/1987 |
| JP | 6-122812 | 5/1994 |
| JP | 2001-261954 | 9/2001 |
| JP | 2006-160792 | 6/2006 |
| JP | 2009-230156 | 10/2009 |
| JP | 4404539 | 11/2009 |
| KR | 10-2012-0041929 | 5/2012 |
| WO | 2005/103152 | 11/2005 |

OTHER PUBLICATIONS

International Search Report issued Jun. 11, 2013 in International (PCT) Application No. PCT/JP2013/063568.

*Primary Examiner* — Edward Cain
(74) *Attorney, Agent, or Firm* — Wenderoth, Lind & Ponack, L.L.P.

(57) ABSTRACT

The present invention provides an unsaturated polyester resin composition including an unsaturated polyester, a crosslinking agent, an inorganic filling material, a hollow filler, and a fibrous reinforcing material, in which the hollow filler has a content ratio of a hollow filler having a particle diameter of 30 μm or less of 80 vol % or more with respect to the total volume of the hollow filler, and in which the content of the hollow filler in the unsaturated polyester resin composition is from 15 to 24 mass %. The unsaturated polyester resin composition can provide a molded article having both reduced specific gravity and improved self-tapping strength while maintaining the conventional characteristics (surface smoothness, heat resistance, mechanical strength, dimensional accuracy, and moldability).

13 Claims, No Drawings

UNSATURATED POLYESTER RESIN COMPOSITION, MOLDED ARTICLE THEREOF, AND LAMP REFLECTOR

TECHNICAL FIELD

The present invention relates to a lamp reflector to be used for various lamps such as headlamps and fog lamps for vehicles, and to an unsaturated polyester resin composition and molded article thereof that can be suitably used for manufacture of the lamp reflector.

BACKGROUND ART

An unsaturated polyester resin composition containing an unsaturated polyester resin, an inorganic filling material, and a fibrous reinforcing material (bulk molding compound: BMC) is widely used in various applications such as the chassis of OA and office equipment, and lamp reflectors typified by headlamps because of its excellent characteristics (e.g., mechanical strength, rigidity, surface smoothness, dimensional accuracy, heat resistance, and moldability).

Although a related-art unsaturated polyester resin composition can be cured and molded to provide a molded article excellent in mechanical strength, rigidity, surface smoothness, dimensional accuracy, and heat resistance, the related-art unsaturated polyester resin composition has a problem in that high content of the inorganic filling material and the fibrous reinforcing material is required in order to maintain these excellent characteristics, resulting in an increase in specific gravity of the molded article. In addition, the unsaturated polyester resin generally provides a molded article having a high specific gravity as compared to thermoplastic resins, and hence its range of utilization has been limited heretofore.

Thus, to solve the problem, various methods of reducing specific gravity have been developed. As a typical method, there is known a method involving reducing the contents of the inorganic filling material and the fibrous reinforcing material, and adding a hollow filler such as glass balloons or silica balloons (see, for example, Patent Literatures 1 and 2).

However, a lamp is constituted by various parts, and a lamp reflector, one of the parts, is fastened to other parts (such as parts for fixing the lamp reflector, fixing a bulb, and a hood for adjusting light) through the use of self-tapping screws. In particular, the lamp reflector is an important part for directing light from a light source in a certain direction. The lamp reflector needs to be fixed at a certain position in order to suppress deviations in light direction.

PRIOR ART REFERENCES

Patent Documents

Patent Document 1: JP 2001-261954 A
Patent Document 2: JP 4404539 B2

SUMMARY OF THE INVENTION

Problems to be Solved by the Invention

Although an unsaturated polyester resin composition obtained by a related-art method provides a molded article having a low specific gravity, the molded article does not have sufficient self-tapping strength. Accordingly, when the molded article is used as a base material for a lamp reflector, a self-tapping portion can break at the time of assembly of the lamp or during use, and thus the lamp reflector cannot be fixed. As a result, the direction of light from the lamp is difficult to fix. Accordingly, it is impossible to stably obtain the basic function of the lamp reflector, i.e., to direct light from a light source in a certain direction.

The present invention has been made in order to solve the above-mentioned problem, and an object of the present invention is to provide an unsaturated polyester resin composition that provides a molded article having both a reduced specific gravity and improved self-tapping strength while maintaining the conventional characteristics (surface smoothness, heat resistance, mechanical strength, dimensional accuracy, and moldability).

Another object of the present invention is to provide a molded article and lamp reflector having both a reduced specific gravity and improved self-tapping strength while maintaining the conventional characteristics (surface smoothness, heat resistance, mechanical strength, dimensional accuracy, and moldability).

Means for Solving the Problems

The inventors of the present invention have made extensive studies in order to solve the above-mentioned problem, and as a result, have found that a reduction in self-tapping strength is caused by blending of a hollow filler, and a balance between reduction in specific gravity and improvement in self-tapping strength can be improved by controlling the size of the hollow filler to enhance adhesiveness between the hollow filler and resin components, thereby improving the self-tapping strength and by specifying the blending amount of the hollow filler. Thus, the inventors have completed the present invention.

That is, the present invention provides the following items [1] to [8].

[1] An unsaturated polyester resin composition comprising an unsaturated polyester, a crosslinking agent, an inorganic filling material, a hollow filler, and a fibrous reinforcing material, in which the hollow filler has a content ratio of a hollow filler having a particle diameter of 30 μm or less of 80 vol % or more with respect to a total volume of the hollow filler, and in which content of the hollow filler in the unsaturated polyester resin composition is from 15 to 24 mass %.

[2] An unsaturated polyester resin composition according to [1], in which the hollow filler has a true specific gravity of from 0.4 to 0.7.

[3] An unsaturated polyester resin composition according to [1] or [2], in which the hollow filler includes at least one of glass balloons, silica balloons, or alumina balloons.

[4] An unsaturated polyester resin composition for a lamp reflector, including the unsaturated polyester resin composition according to any one of [1] to [3].

[5] A molded article, which is obtained by molding and curing the unsaturated polyester resin composition according to any one of [1] to [4].

[6] A molded article according to [5], in which the molded article has a self-tapping strength of 1.7 N·m or more.

[7] A molded article according to [5] or [6], in which the molded article has a specific gravity of from 1.1 to 1.3.

[8] A lamp reflector, including the molded article according to any one of [5] to [7] as a base material.

Effects of the Invention

According to the present invention, it is possible to provide the unsaturated polyester resin composition that provides a molded article having both a reduced specific gravity and improved self-tapping strength while maintaining the conventional characteristics (surface smoothness, heat resistance, mechanical strength, dimensional accuracy, and moldability).

In addition, according to the present invention, it is possible to provide the molded article and lamp reflector having both a reduced specific gravity and improved self-tapping strength while maintaining the conventional characteristics (surface smoothness, heat resistance, mechanical strength, dimensional accuracy, and moldability).

MODE FOR CARRYING OUT THE INVENTION

An unsaturated polyester resin composition of the present invention, which can be suitably used for a lamp reflector, contains an unsaturated polyester, a crosslinking agent, an inorganic filling material, a hollow filler, and a fibrous reinforcing material. Each component is described below.

The unsaturated polyester to be used in the present invention is not particularly limited, and one known in the art may be used. The unsaturated polyester is generally a compound obtained through polycondensation (esterification) of a polyhydric alcohol with an unsaturated polybasic acid and, as required, a saturated polybasic acid, and an appropriate one may be selected and used depending on desired characteristics.

The weight-average molecular weight (MW) of the unsaturated polyester is not particularly limited, but is preferably from 5,000 to 20,000. It should be noted that the term "weight-average molecular weight" as used herein means a value determined with a standard polystyrene calibration curve on the basis of measurement at ordinary temperature under the following conditions through the use of gel permeation chromatography (hereinafter also referred to as "GPC").
Column temperature: 40° C.
Sample: 0.2 mass % unsaturated polyester solution in tetrahydrofuran
Row rate: 1 mL/min
Eluent: tetrahydrofuran
Detector: differential refractive index detector The polyhydric alcohol used for the synthesis of the unsaturated polyester is not particularly limited, and a known one may be used. Examples of the polyhydric alcohol include ethylene glycol, propylene glycol, neopentyl glycol, butanediol, diethylene glycol, dipropylene glycol, triethylene glycol, pentanediol, hexanediol, hydrogenated bisphenol A, bisphenol A, and glycerin. Of these, propylene glycol, neopentyl glycol, and bisphenol A or hydrogenated bisphenol A are preferred from the viewpoints of heat resistance, mechanical strength, and moldability. One of these polyhydric alcohols may be used alone, or two or more thereof may be used in combination.

The unsaturated polybasic acid to be used for the synthesis of the unsaturated polyester is not particularly limited, and a known one may be used. Examples of the unsaturated polybasic acid include maleic anhydride, fumaric acid, citraconic acid, and itaconic acid. Of these unsaturated polybasic acids, maleic anhydride and fumaric acid are preferred from the viewpoints of, for example, heat resistance, mechanical strength, and moldability. One of these unsaturated polybasic acids may be used alone, or two or more thereof may be used in combination.

The saturated polybasic acid used for the synthesis of the unsaturated polyester is not particularly limited, and a known one may be used. Examples of the saturated polybasic acid include phthalic anhydride, isophthalic acid, terephthalic acid, Het acid, succinic acid, adipic acid, sebacic acid, tetrachlorophthalic anhydride, tetrabromophthalic anhydride, and endomethylenetetrahydrophthalic anhydride. One of these saturated polybasic acids may be used alone, or two or more thereof may be used in combination.

The unsaturated polyester may be synthesized by a known method with the use of the raw materials as described above. Various conditions in the synthesis need to be appropriately set depending on the raw materials to be used and their amounts. In general, it suffices to perform esterification at a temperature of from 140 to 230° C. under increased or reduced pressure in a stream of an inert gas such as nitrogen. In the esterification reaction, an esterification catalyst may be used as required. Examples of the catalyst include known catalysts such as manganese acetate, dibutyltin oxide, stannous oxalate, zinc acetate, and cobalt acetate. One of these catalysts may be used alone, or two or more thereof may be used in combination.

The crosslinking agent to be used in the present invention is not particularly limited as long as it has a polymerizable double bond polymerizable with the unsaturated polyester, and one known in the art may be used. Examples of the crosslinking agent include a styrene monomer, a diallyl phthalate monomer, a diallyl phthalate prepolymer, methyl methacrylate, and triallyl isocyanurate. Of these crosslinking agents, a styrene monomer is preferably used.

The blending amount of the crosslinking agent is not particularly limited, but from the viewpoints of workability, polymerizability, the shrinkage property of a molded article, and the degree of freedom in amount adjustment, is preferably from 25 to 70 parts by mass, more preferably from 35 to 65 parts by mass with respect to 100 parts by mass in total of the unsaturated polyester and the crosslinking agent.

The inorganic filling material to be used in the present invention is not particularly limited, and one known in the art other than the hollow filler to be described later may be used. Examples of the inorganic filling material include calcium carbonate, aluminum hydroxide, wollastonite, clay, talc, mica, and silicon dioxide. Of these, calcium carbonate is preferred from the viewpoints of surface smoothness and heat resistance.

The average particle diameter of the inorganic filling material is not particularly limited, but is preferably 0.5 μm or more. When the average particle diameter of the inorganic filling material is 0.5 μm or more, an unsaturated polyester resin composition having a low viscosity and satisfactory moldability is easily obtained. Consequently, it becomes difficult for the hollow filler to be broken at the time of molding, and hence a molded article having a small specific gravity tends to be easily obtained. In addition, from the viewpoint of moldability, the average particle diameter of the inorganic filling material is more preferably 0.7 μm or more.

Meanwhile, from the viewpoint of surface smoothness and mechanical characteristics of the molded article, the average particle diameter of the inorganic filling material is preferably 15 μm or less, more preferably 10 μm or less. When the average particle diameter of the inorganic filling material is 15 μm or less, the molded article tends to have satisfactory surface smoothness and mechanical strength and the unsaturated polyester resin composition tends to have satisfactory fluidity, resulting in excellent moldability.

As used herein, the term "average particle diameter" of the inorganic filling material means a particle diameter determined by calculation from a specific surface area determined by an air permeability method.

$$\text{Average particle diameter} = (6 \times 10000)/(\text{True specific gravity} \times \text{Specific surface area})$$

The blending amount of the inorganic filling material is not particularly limited, but is preferably from 40 to 200 parts by mass, more preferably from 50 to 150 parts by mass with respect to 100 parts by mass in total of the unsaturated polyester and the crosslinking agent. When the blending amount of the inorganic filling material is 40 parts by mass or more, the unsaturated polyester resin composition has satisfactory moldability, and it is difficult for voids, floating of the inorganic filling material, or the like to occur in the molded article. Accordingly, a molded article excellent in surface smoothness and mechanical strength can be easily obtained. When the blending amount of the inorganic filling material is 200 parts by mass or less, a molded article having a small specific gravity can be easily obtained.

The hollow filler to be used in the present invention needs to be controlled in size from the viewpoint of enhancing adhesiveness between the hollow filler and resin components (unsaturated polyester and crosslinking agent). The hollow filler generally has a smooth, truly spherical surface. Accordingly, when its particle diameter is excessively large, a contact area between the resin components and the hollow filler is reduced to reduce the adhesiveness between the resin component and the hollow filler. As a result, not only the characteristics such as mechanical strength of the molded article to be obtained from the unsaturated polyester resin composition, but also the self-tapping strength may be reduced. Accordingly, it is necessary that the hollow filler to be used in the present invention have a content ratio of a hollow filler with a particle diameter of 30 µm or less of 80 vol % or more with respect to the total volume of the hollow filler, and the content ratio is preferably 84 vol % or more, more preferably 90 vol % or more. A method of controlling the ratio of the hollow filler having a particle diameter of 30 µm or less is not particularly limited, and for example, it suffices to blend commercially available hollow fillers so as to obtain the above-mentioned ratio. Herein, the "ratio of the hollow filler having a particle diameter of 30 µm or less" can be calculated from a particle size distribution determined by a laser diffraction/scattering method. When the ratio of the hollow filler having a particle diameter of 30 µm or less is less than 80 vol %, desired self-tapping strength is not obtained. As a result, when the molded article is used as a base material for a lamp reflector, a self-tapping portion can break at the time of assembly of the lamp or during use, and thus the lamp reflector cannot be fixed. It should be noted that the upper limit of the ratio of the hollow filler having a particle diameter of 30 µm or less is not particularly limited, and the hollow filler having a particle diameter of 30 µm or less may account for the entire hollow filler.

The kind of hollow filler is not particularly limited, and one known in the art may be used. Examples of the hollow filler include glass balloons, silica balloons, and alumina balloons. Of these, glass balloons are preferred.

The collapse strength of the hollow filler is not particularly limited, but is preferably 55 MPa or more. When the collapse strength is 55 MPa or more, the mechanical strength of the hollow filler tends to be excellent, and it is difficult for the hollow filler to be broken when manufacturing and molding the unsaturated polyester resin composition. Accordingly, a molded article having a low specific gravity is easily obtained. As used herein, the term "collapse strength of the hollow filler" means a pressure at which 90 vol % of the hollow filler remains without breaking upon application of a pressure to the hollow filler on the basis of ASTM D-3102.

The true specific gravity of the hollow filler is not particularly limited, but is preferably 0.7 or less. When the true specific gravity of the hollow filler is 0.7 or less, the specific gravity of the molded article obtained by the unsaturated polyester resin composition can be easily reduced. On the other hand, because there is little risk of breaking the hollow filler when manufacturing and molding the unsaturated polyester resin composition, increasing the specific gravity of the molded article, the true specific gravity of the hollow filler is preferably 0.3 or more. In particular, the hollow filler tends to have a smaller particle diameter as its true specific gravity becomes smaller, and in consideration of, for example, the particle diameter of the hollow filler and the above-mentioned characteristics, the true specific gravity of the hollow filler is more preferably from 0.4 to 0.7, most preferably from 0.5 to 0.7.

The blending amount of the hollow filler in the unsaturated polyester resin composition is from 15 to 24 mass %. When the blending amount of the hollow filler is less than 15 mass %, the reduction in specific gravity is not sufficient. On the other hand, when the blending amount of the hollow filler is more than 24 mass %, the desired self-tapping strength is not obtained.

In this context, the self-tapping strength generally is generally reduced as the blending amount of the hollow filler increases. Particularly when a general hollow filler that is not controlled in size is used, a blending amount of 15 mass % or more markedly reduces the self-tapping strength. As a result, when the molded article is used as a base material for a lamp reflector, the self-tapping portion will break at the time of assembly or use of a lamp.

In contrast, in the present invention, a hollow filler that is controlled in size is used. Accordingly, even when the blending amount is 15 mass % or more, the adhesiveness between the hollow filler and the resin components can be enhanced to secure self-tapping strength appropriate for use as a lamp reflector. However, when the blending amount of the hollow filler is excessively large, reductions in self-tapping strength cannot be prevented. Accordingly, it is necessary to set the upper limit of the blending amount of the hollow filler to 24 mass %. The blending amount of the hollow filler is preferably from 16 to 22 mass %, more preferably from 18 to 21 mass %.

The fibrous reinforcing material to be used in the invention is not particularly limited, and those known in the art may be used. Examples of the fibrous reinforcing material may include various organic fibers and inorganic fibers such as glass fiber, pulp fiber, Tetoron (trademark) fiber, vinylon fiber, carbon fiber, aramid fiber, and wollastonite. Of these, glass fiber, in particular, chopped strand glass that has been cut so as to have a fiber length of from about 1.5 to 25 mm is preferably used.

The blending amount of the fibrous reinforcing material is not particularly limited, but is preferably from 60 to 105 parts by mass, more preferably from 70 to 95 parts by mass with respect to 100 parts by mass in total of the unsaturated polyester and the crosslinking agent. When the blending amount of the fibrous reinforcing material is 60 parts by mass or more, moldability is satisfactory, it is difficult for voids, floating of the fibrous reinforcing material, or the like to occur in the molded article, and a molded article excellent in surface smoothness and mechanical strength can be easily obtained. When the blending amount of the fibrous reinforcing material is 105 parts by mass or less, a molded article having a low specific gravity can be easily obtained.

The composition of the unsaturated polyester resin composition of the present invention containing the components as described above is, in summary, as follows: the content of the hollow filler in the unsaturated polyester resin composition is from 15 to 24 mass %, and with respect to 100 parts by mass in total of the unsaturated polyester and the crosslinking agent, it is preferred that the amount of the crosslinking agent be from 25 to 70 parts by mass, the amount of the inorganic filling material be from 40 to 200 parts by mass, and the amount of the fibrous reinforcing material be from 60 to 105 parts by mass, and it is more preferable that the amount of the crosslinking agent be from 35 to 65 parts by mass, the amount of the inorganic filling material be from 50 to 150 parts by mass, and the amount of the fibrous reinforcing material be from 70 to 95 parts by mass.

The unsaturated polyester resin composition of the present invention may contain, in addition to the above-mentioned components, components known in the art, such as a shrinkage reducing agent, a curing agent, a mold release agent, a thickening agent, a pigment, and a viscosity reducing agent, as long as the effects of the present invention are not impaired.

Examples of the shrinkage reducing agent include thermoplastic polymers commonly used as a shrinkage reducing agent, such as polystyrene, polymethyl methacrylate, polyvinyl acetate, saturated polyester, and styrene-butadiene-based rubber. One of these shrinkage reducing agents may be used alone, or two or more thereof may be used in combination.

Examples of the curing agent include organic peroxides such as t-butyl peroxyoctoate, benzoyl peroxide, 1,1-di-t-butylperoxy-3,3,5-trimethylcyclohexane, t-butyl peroxyso-propylcarbonante, t-butyl peroxybenzoate, dicumyl peroxide, and di-t-butyl peroxide. One of these curing agents may be used alone, or two or more thereof may be used in combination.

Examples of the mold release agent include stearic acid, zinc stearate, calcium stearate, aluminum stearate, magnesium stearate, and carnauba wax. One of these mold release agents may be used alone, or two or more thereof may be used in combination.

Examples of the thickening agent include: a metal oxide such as magnesium oxide, magnesium hydroxide, calcium hydroxide, or calcium oxide; and an isocyanate compound. One of these thickening agents may be used alone, or two or more thereof may be used in combination.

The unsaturated polyester resin composition of the present invention, which is constituted of the components as described above, may be manufactured by a method generally employed in the art such as kneading using a kneader or the like.

The unsaturated polyester resin composition of the present invention to be thus manufactured has blended therein the hollow filler that is controlled in size at a specific ratio, and hence can provide a molded article having both a reduced specific gravity (the molded article has a specific gravity of less than 1.4, preferably from 1.1 to 1.3) and improved self-tapping strength while maintaining conventional characteristics (surface smoothness, heat resistance, mechanical strength, dimensional accuracy, and moldability).

The molded article may be manufactured by molding and curing the unsaturated polyester resin composition of the present invention into a desired shape. The method for the molding and curing is not particularly limited, and methods generally employed in the art such as compression molding, transfer molding, or injection molding may be used.

The molded article to be thus manufactured has a self-tapping strength of preferably 1.7 N·m or more. When the self-tapping strength is less than 1.7 N·m, a self-tapping portion may be broken upon fastening with a self-tapping screw.

The molded article obtained from the unsaturated polyester resin composition of the present invention is suitable for use as a base material for a lamp reflector. That is, self-tapping screws are generally used to fasten the lamp reflector to parts such as a part for fixing the lamp reflector, a part for fixing a bulb, and a hood for adjusting light. In this connection, the molded article obtained from the unsaturated polyester resin composition of the present invention has high self-tapping strength, and hence when used as a base material for the lamp reflector, can prevent the breakage of a self-tapping portion at the time of assembling or using a lamp. Thus, the lamp reflector using, as the base material, the molded article obtained from the unsaturated polyester resin composition of the present invention can suppress deviations in light direction.

In a lamp reflector using, as the base material, the molded article obtained from the unsaturated polyester resin composition of the present invention, a metal reflective layer is formed on the base material.

The material for the metal reflective layer is not particularly limited as long as it is one that may be used for a lamp reflector. For example, there may be used a metal such as aluminum, silver, or zinc, or an alloy containing any such metal as a main component.

The method for the formation of the metal reflective layer is not particularly limited, and for example, a known method such as a vacuum deposition method may be used.

The thickness of the metal reflective layer, which only needs to be appropriately set depending on, for example, the required size of the lamp reflector, is generally from 800 to 2,000 Å.

In addition, in order to enhance adhesiveness between the base material and the metal reflective layer, a primer layer may be formed between the base material and the metal reflective layer.

The primer layer is not particularly limited, and may be formed using a method known in the art. For example, the primer layer may be formed by applying a primer composition onto the base material, followed by drying. The method for the application of the primer composition onto the base material is not particularly limited, and for example, a known method such as an air spray system or an airless spray system may be used. In addition, regarding a drying method, the temperature and the like only need to be appropriately adjusted depending on the composition of the primer composition and the application method.

The thickness of the primer layer, which only needs to be appropriately set depending on, for example, the required size of the lamp reflector, is generally from 10 to 30 μm.

EXAMPLES

The present invention is hereinafter described in more detail by way of Examples and Comparative Examples. However, the present invention is by no means limited to the descriptions of the Examples and Comparative Examples.

Various physical properties of the unsaturated polyester resin compositions of the Examples and Comparative Examples below, and molded articles thereof were evaluated as described below.

(1) Weight-Average Molecular Weight

Measurement was performed under the above-mentioned conditions using: Shodex (trademark) GPC-101 manufactured by Showa Denko K.K. as a chromatograph; a GPC column (model LF-804) manufactured by Showa Denko K.K. as a column; and a differential refractive index detector (model RI-71S) manufactured by Showa Denko K.K. as a detector.

(2) Molding Shrinkage Rate

Injection molding was performed under the conditions of a molding temperature of 150° C., an injection pressure of 30 MPa, and a molding time of 3 minutes to produce a shrinkage disc specified in JIS K6911, and its molding shrinkage rate was calculated on the basis of JIS K6911 5.7.

(3) Specific Gravity

Injection molding was performed under the conditions of a molding temperature of 150° C., an injection pressure of 30 MPa, and a molding time of 3 minutes to produce a shrinkage disc specified in JIS K6911, which was then cut into a test piece, and its specific gravity was measured on the basis of JIS K6911.

(4) Mechanical Strength

Compression molding was performed under the conditions of a molding temperature of 150° C., a molding pressure of 10 MPa, and a molding time of 3 minutes to produce a test piece for flexural strength and flexural modulus of elasticity specified in JIS K6911, and its flexural strength and flexural modulus of elasticity were measured on the basis of JIS K6911.

(5) Molded Article Evaluation (External Appearance)

Transfer molding was performed under the conditions of a molding temperature of 140° C., an injection pressure of 25 MPa, and a molding time of 1 minute to produce a transfer molded article (disc shape, diameter: 117 mm, thickness: 3 mm (uniform)). The molded article was evaluated for external appearance leveling and filling property by visual observation. In this evaluation, a satisfactory result was represented by the symbol "○", a slightly inferior result was represented by the symbol "Δ", and a poor result was represented by the symbol "×".

(6) Self-Tapping Strength

Injection mold was performed under the conditions of a molding temperature of 150° C., an injection pressure of 50 MPa, and a molding time of 2 minutes to produce a self-tapping boss-shaped test piece (boss outer diameter: φ8 mm, pilot hole diameter: φ3.6 mm).

Next, tightening torque strength at break occurring upon fastening of the test piece with a type 2 grooved tapping screw (L=12 mm) having a screw diameter of "M4" was measured with a torque driver (digital torque tester "HDP-50" manufactured by HIOS). In this evaluation, satisfactory tapping strength was represented by the symbol "○", and unsatisfactory tapping strength was represented by the symbol "×".

(Preparation of Unsaturated Polyester)

A four-necked flask equipped with a temperature gauge, a stirrer, an inert gas inlet, and a reflux condenser was loaded with fumaric acid, propylene glycol, and hydrogenated bisphenol A at a molar ratio of 100:80:20. While the mixture was heated and stirred under a stream of nitrogen, the temperature was increased to 230° C., and an esterification reaction was performed by a routine procedure to obtain an unsaturated polyester. The weight-average molecular weight (MW) of the unsaturated polyester was measured under the above-mentioned conditions and found to be 10,000.

(Hollow Filler)

As a hollow filler, various grades of glass hollow fillers manufactured by the 3M Company were used alone, or as a mixture of two or more kinds, or after being sieved by the inventors of the present invention so as to be any one of the blends as described below.

As a hollow filler A, there was used a hollow filler having a ratio of a hollow filler having a particle diameter of 30 μm or less of 97 vol %, a collapse strength of 190 MPa, and a true specific gravity of 0.6.

As a hollow filler B, there was used a hollow filler having a ratio of a hollow filler having a particle diameter of 30 μm or less of 90 vol %, a collapse strength of 150 MPa, and a true specific gravity of 0.6.

As a hollow filler C, there was used a hollow filler having a ratio of a hollow filler having a particle diameter of 30 μm or less of 80 vol %, a collapse strength of 120 MPa, and a true specific gravity of 0.6.

As a hollow filler D, there was used a hollow filler having a ratio of a hollow filler having a particle diameter of 30 μm or less of above 99 vol %, a collapse strength of 250 MPa, and a true specific gravity of 0.6.

As a hollow filler E, there was used a hollow filler having a ratio of a hollow filler having a particle diameter of 30 μm or less of 85 vol %, a collapse strength of 100 MPa, and a true specific gravity of 0.46.

As a hollow filler F, there was used a hollow filler having a ratio of a hollow filler having a particle diameter of 30 μm or less of 60 vol %, a collapse strength of 83 MPa, and a true specific gravity of 0.6.

As a hollow filler G, there was used a hollow filler having a ratio of a hollow filler having a particle diameter of 30 μm or less of 35 vol %, a collapse strength of 41 MPa, and a true specific gravity of 0.46.

Examples 1 to 7 and Comparative Examples 1 to 6

The unsaturated polyester and hollow fillers described above and components shown in Table 1 were kneaded at ratios shown in Table 1 using a double-arm kneader at 30° C. to obtain unsaturated polyester resin compositions. It should be noted that in Table 1, the unit of the blending amount of each component is parts by mass.

The thus obtained unsaturated polyester resin compositions were subjected to the above-mentioned evaluations. Table 1 shows the results.

TABLE 1

| | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Unsaturated polyester | 50 | 50 | 50 | 50 | 50 | 50 | 50 | 50 | 50 | 50 | 50 | 50 | 50 |
| Styrene monomer | 50 | 50 | 50 | 50 | 50 | 50 | 50 | 50 | 50 | 50 | 50 | 50 | 50 |
| polystyrene | 28 | 28 | 28 | 28 | 28 | 28 | 28 | 28 | 28 | 28 | 28 | 28 | 28 |
| Calcium carbonate | 90 | 90 | 90 | 75 | 75 | 135 | 85 | 90 | 135 | 175 | 85 | 45 | 175 |

TABLE 1-continued

|  | Example | | | | | | | Comparative Example | | | | | |
| --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 |
| Hollow filler A | 75 | — | — | — | — | — | — | — | — | — | — | — | — |
| Hollow filler B | — | 75 | — | — | — | — | — | — | — | — | — | — | — |
| Hollow filler C | — | — | 75 | — | 80 | 65 | — | — | — | — | — | 90 | 55 |
| Hollow filler D | — | — | — | 90 | — | — | — | — | — | — | — | — | — |
| Hollow filler E | — | — | — | — | — | — | 60 | — | — | — | — | — | — |
| Hollow filler F | — | — | — | — | — | — | — | 75 | 65 | 55 | — | — | — |
| Hollow filler G | — | — | — | — | — | — | — | — | — | — | 60 | — | — |
| t-Butyl peroxybenzoate | 3 | 3 | 3 | 3 | 3 | 3 | 3 | 3 | 3 | 3 | 3 | 3 | 3 |
| zinc sterate | 6 | 6 | 6 | 6 | 6 | 6 | 6 | 6 | 6 | 6 | 6 | 6 | 6 |
| Chopped glass (fiber length: 6 mm) | 85 | 85 | 85 | 85 | 85 | 85 | 85 | 85 | 85 | 85 | 85 | 85 | 85 |
| Contant of hollow filler (mass %) | 19.4 | 19.4 | 19.4 | 23.3 | 21.2 | 15.4 | 16.4 | 19.4 | 15.4 | 12.2 | 16.4 | 25.2 | 12.2 |
| (1) Molding shrinkage rate | −0.03 | −0.02 | −0.02 | −0.01 | −0.01 | −0.02 | −0.01 | −0.01 | −0.01 | −0.01 | 0.02 | 0.00 | −0.03 |
| (2) Specific gravity | 1.19 | 1.19 | 1.19 | 1.20 | 1.15 | 1.30 | 1.12 | 1.19 | 1.30 | 1.40 | 1.20 | 1.07 | 1.40 |
| (3) Mechanical strength Flexural strength (Mpa) | 138 | 137 | 132 | 142 | 130 | 135 | 135 | 126 | 130 | 140 | 120 | 122 | 145 |
| Flexural modulus of elasticity (Gpa) | 12.1 | 11.8 | 11.0 | 12.1 | 10.5 | 11.7 | 12.0 | 9.4 | 10.0 | 11.0 | 9.4 | 9.0 | 12.5 |
| (4) Molded article evalution (external appearance) | ○ | ○ | ○ | ○ | ○ | ○ | ○ | ○ | ○ | ○ | Δ | Δ | ○ |
| (5) Self tapping strength Toeque strength | 2.1 | 2.1 | 1.9 | 2.0 | 1.8 | 2.2 | 2.1 | 1.2 | 1.6 | 2.1 | 1.5 | 1.2 | 2.3 |
| Evalution | ○ | ○ | ○ | ○ | ○ | ○ | ○ | x | x | ○ | x | x | ○ |

As shown in Table 1, in the case of each of the unsaturated polyester resin compositions of Examples 1 to 7, there was obtained a molded article being excellent in molding shrinkage rate, mechanical strength, and external appearance, and having both a reduced specific gravity and improved self-tapping strength.

In contrast, in the case of each of the unsaturated polyester resin compositions of Comparative Examples 1, 2, and 4, the ratio of the hollow filler having a particle diameter of 30 μm or less was so low that the self-tapping strength of the molded article was reduced. In addition, in the case of each of the unsaturated polyester resin compositions of Comparative Examples 3 and 6, the self-tapping strength of the molded article was able to be maintained by reducing the content of the hollow filler, but the reduction in specific gravity of the molded article was not sufficient. Further, in the case of the unsaturated polyester resin composition of Comparative Example 5, the ratio of the hollow filler in the composition was so high that the self-tapping strength of the molded article was reduced and the molded article external appearance degraded.

As apparent from the above-mentioned results, according to the present invention, there can be provided an unsaturated polyester resin composition that provides a molded article having both a reduced specific gravity and improved self-tapping strength while maintaining the conventional characteristics. The unsaturated polyester resin composition is suitable for a lamp reflector, and moreover, can be suitably used in a field in which high strength and low specific gravity are preferred.

This international application claims priority from Japanese Patent Application No. 2012-120984, filed on May 28, 2012, the entire disclosure of which is incorporated herein by reference.

The invention claimed is:

1. An unsaturated polyester resin composition comprising an unsaturated polyester, a crosslinking agent, an inorganic filling material, a hollow filler, and a fibrous reinforcing material,
wherein the hollow filler has a content ratio of a hollow filler having a particle diameter of 30 μm or less of 80 vol % or more with respect to a total volume of the hollow filler,
wherein a content of the hollow filler in the unsaturated polyester resin composition is from 15 to 24 mass %, and
wherein the hollow filler has a true specific gravity of from 0.4 to 0.7.

2. The unsaturated polyester resin composition according to claim 1, wherein the hollow filler comprises at least one of glass balloons, silica balloons, or alumina balloons.

3. An unsaturated polyester resin composition for a lamp reflector, comprising the unsaturated polyester resin composition according to claim 1.

4. A molded article, which is obtained by molding and curing the unsaturated polyester resin composition according to claim 1.

5. The molded article according to claim 4, wherein the molded article has a self-tapping strength of 1.7 N·m or more.

6. The molded article according to claim 4, wherein the molded article has a specific gravity of from 1.1 to 1.3.

7. A lamp reflector, comprising the molded article according to claim 4 as a base material.

8. An unsaturated polyester resin composition for a lamp reflector, comprising the unsaturated polyester resin composition according to claim 2.

9. A molded article, which is obtained by molding and curing the unsaturated polyester resin composition according to claim 2.

10. A molded article, which is obtained by molding and curing the unsaturated polyester resin composition according to claim 3.

11. The molded article according to claim 5, wherein the molded article has a specific gravity of from 1.1 to 1.3.

12. A lamp reflector, comprising the molded article according to claim 5 as a base material.

13. A lamp reflector, comprising the molded article according to claim 6 as a base material.

* * * * *